May 1, 1956  O. W. MUFF  2,743,742
LINE BLIND
Filed July 14, 1952

OLIVER W. MUFF
INVENTOR.

BY Hazard & Miller
ATTORNEYS

United States Patent Office 2,743,742
Patented May 1, 1956

2,743,742
LINE BLIND

Oliver W. Muff, Los Angeles, Calif., assignor of five-sixths to Robinson Orifice Fitting Company, Los Angeles, Calif., a corporation of Nevada Application July 14, 1952, Serial No. 298,655

5 Claims. (Cl. 138—44)

This invention relates to a line blind and orifice fitting.

There are many situations in conducting the flow of fluids through pipes and similar conduits wherein it is desired to either shut off the flow of fluid entirely, permit complete flow, or cause the flow to pass through an orifice plate with which a differential pressure meter is associated so as to determine therefrom the amount of flow.

An object of the present invention is to provide a fitting of this character which may be incorporated in a pipe line or the like and which is so designed that optionally the flow therethrough may be either fully permitted, completely stopped, or caused to pass through an orifice plate so that the rate of flow can be measured.

More specifically, an object of the invention is to provide a fitting consisting of a body having an inlet and an outlet between which there is a laterally open seat. A flow-controlling member is receivable through the lateral opening and is adapted to seat on the seat in such a manner as to effectively prevent leakage through the lateral opening. A highly simplified, but nevertheless, very efficient means is provided for forcing the flow-controlling member into seated position or removing it therefrom.

Another object of the invention is to provide a flow-controlling member for a fitting of this character wherein orifice plates may be readily applied, removed, and replaced as occasion may require.

With the foregoing and other objects in view, which will be made manifest in the following detailed description and specifically pointed out in the appended claims, reference is had to the accompanying drawing for an illustrative embodiment of the invention, wherein:

Figure 1:
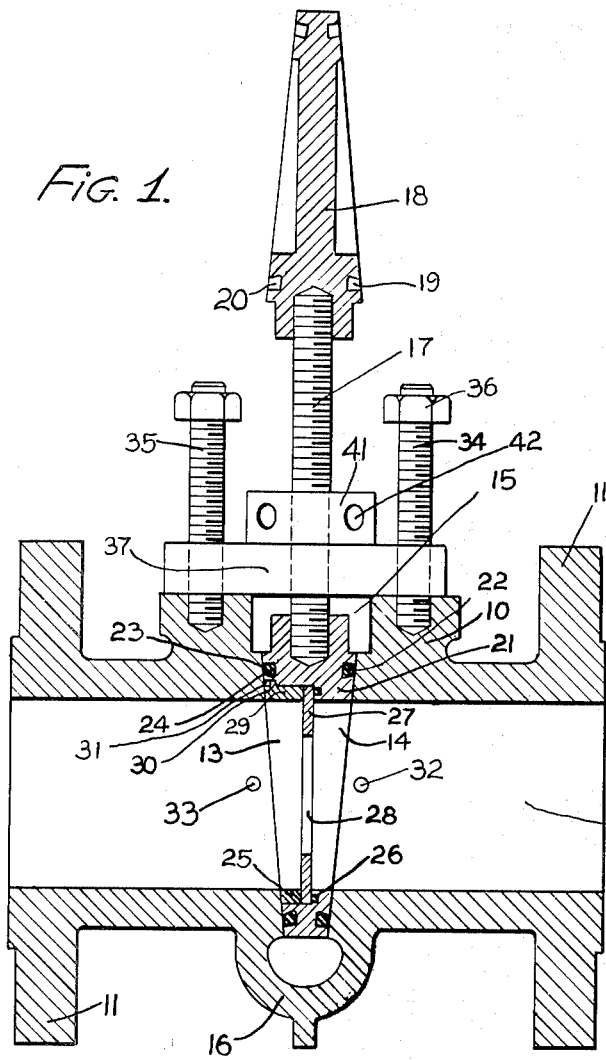
Figure 1 is a longitudinal vertical section through a combined line blind and orifice fitting embodying the present invention, the fitting being illustrated in that position wherein the flow-controlling member can be forcibly removed from its seat within the body.

Referring to the accompanying drawing wherein similar reference characters designate similar parts throughout, the improved fitting comprises a body generally indicated at 10. This body is preferably flanged at its ends with flanges 11 enabling its incorporation in a pipe line. A longitudinally extending straight bore 12 extends through the body, one end of which may constitute an inlet and the other end of which may constitute an outlet. Between the inlet and the outlet there is formed a laterally open seat. This seat is illustrated as consisting of two downwardly converging planar seating surfaces 13 and 14 that extend downwardly from an opening 15 formed in the top of the body. The sides of the body, as well as the bottom of the body, are closed around these seating surfaces as indicated at 16 on the bottom.

A threaded stem 17 is provided which has at its ends two flow-controlling members 18 and 19. The flow-controlling member 18 is wedge-shaped in form and is adapted when lowered through the opening 15 to seat between the seating surfaces 13 and 14. As illustrated, the central portion of this flow-controlling member is imperforate so that when in position it serves to completely arrest flow through the bore 12. On the side faces of the member 18 there are formed annular grooves 19 and 20 designed to receive O-rings or equivalent seals which are engageable with the seating surfaces 13 and 14 when this flow-controlling member is in seated position. On the other end of the stem 17 there is a similar flow-controlling member consisting of a carrier 21 which is likewise wedge-shaped in form so as to seat between the seating surfaces 13 and 14. This carrier likewise has on its side faces annular grooves 22 and 23 which receive O-rings 24 that are adapted to seal against the seating surfaces when the carrier is in seating position. One side of the carrier is internally enlarged as indicated at 25 and in the back of this enlargement there is an annular groove which receives an O-ring or equivalent seal indicated at 26. An orifice plate 27 having an orifice therein indicated at 28 is receivable in the enlargement against the O-ring 26 and is confined therein by means of a tapered sleeve or ring 29. This ring on application to the carrier is oriented with respect thereto by means of a small protuberance or pin 30 which is receivable in a groove 31 formed in the carrier. The protuberance on entering this groove assures that the ring or sleeve 29 will be properly positioned so that its external face is flush with the face of the carrier 21 and it consequently will seat on the seating surface 13.

Orifice plates of various sizes may be substituted for the orifice plate 27 shown. Some orifice plates may have the aperture 28 therein of such size as to permit unrestricted flow through the fitting. Other orifice plates may have orifices somewhat as depicted.

The walls of the body 10 are provided with apertures 32 and 33 on opposite sides of the seats 13 and 14 and these apertures may be connected to a differential pressure measuring device to determine the pressure upstream and downstream of the orifice so that the flow through the fitting can be ascertained.

Figure 2:
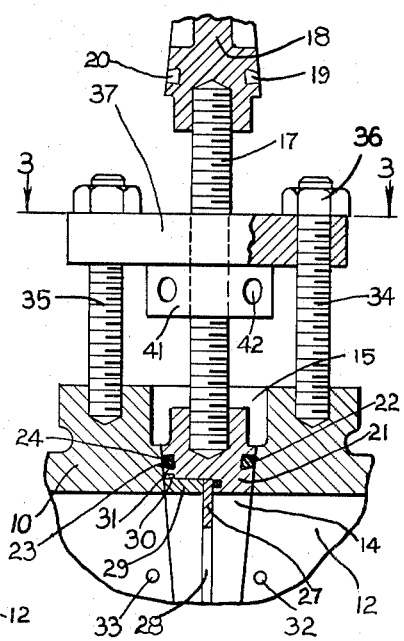
Fig. 2 is a partial vertical section similar to Fig. 1, but illustrating the parts of the fitting in that position wherein the flow-controlling member is being forced against its seat.
Figure 3:
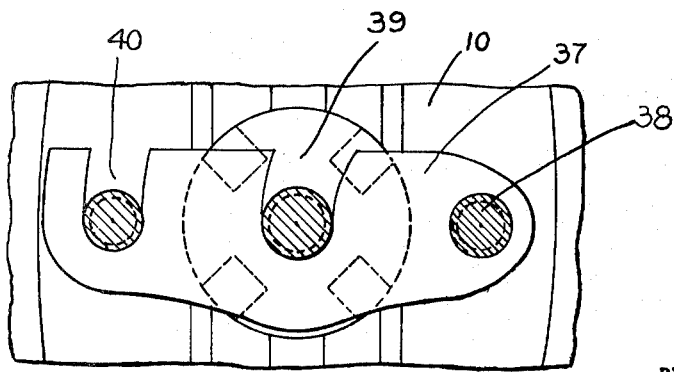
Fig. 3 is a partial top plan view taken substantially upon the line 3—3 upon Fig. 2.

On the top of the body there are two studs 34 and 35 equipped with nuts 36. A lug is provided indicated at 37 having an aperture 38 that is slidable and rotatable on the stud 34. This lug has recesses 39 and 40 designed to receive the stem 17 and the stud 35 respectively. A nut 41 in screwed onto the stem 17 and has radial sockets 42 therein adapted to receive a bar by which the nut can be forcibly rotated. When it is desired to remove either of the flow-controlling members that may be positioned between the seating surfaces 13 and 14 to replace it with the other, or to effect a substitution of orifice plates, a valve upstream of the fitting is closed. With the lug in the position shown in Fig. 1 beneath the nut 41 the nut may be forcibly rotated, causing the stem 17 to function as a jackscrew and forcibly elevate the flow-controlling member in the fitting regardless of how tightly it may be in position therein. When the flow-controlling member in the fitting has been loosened from its seat the lug 37 may be swung laterally about the stud 34 as a center permitting the flow-controlling member to be bodily lifted out of the fitting through the opening 15. Another flow-controlling member, such as the flow-controlling member 18, may then be positioned in the fitting by merely reversing the position of the stem 17. The lug 37 is then slipped upwardly on the stud 34 and swung into engagement with the stud 35 above the nut 41 as depicted in Fig. 2. This stud, which bears against the underside of the nuts 36 enables the nut 41 to be rotated in the reverse direction and thus forcibly drive the flow-controlling member downwardly between the seating surfaces 13 and 14. In this position the fitting may be left so as to hold the flow-controlling member in the position in the fitting regardless of the pressure therein when the upstream valve is again open.

It will be appreciated from the above-described construction that the improved fitting is of relatively simple design and yet enables a quick substitution of one flow-controlling member for another. It enables the flow-controlling member to be forcibly driven onto its seat or removed therefrom. As the flow-controlling member seats between the converging surfaces 13 and 14 the O-rings form a highly effective seal preventing any leakage around the flow-controlling member and through the opening 15.

Various changes may be made in the details of construction without departing from the spirit and scope of the invention as defined by the appended claims.

I claim:

1. A device of the class described comprising a body having an inlet and an outlet and a laterally open seat therebetween, a flow-controlling member receivable in the laterally open seat, a threaded stem on the flow-controlling member, a nut on the stem, studs on the body adjacent the stem, and a lug slidably and swingably mounted on one stud having recesses to receive the other stud and stem when the lug is swung thereagainst, said lug being adapted to optionally assume a position on either side of the nut whereby upon rotation of the nut the flow-controlling member may be optionally forced toward or away from its seat.

2. A device of the class described comprising a body having an inlet and an outlet connected to each other by a passage through the body, a laterally open tapered seat in the body, a wedge-shaped carrier receivable in said seat, said carrier having a passage therethrough adapted to register with the passage in the body when the carrier is seated, O-rings recessed in the sides of the carrier adapted to seal against said seat, the passage adjacent one side of the carrier being internally enlarged, an orifice plate receivable in the enlargement, an O-ring recessed in the carrier against which the orifice plate may seal, a tapered sleeve receivable in the enlargement against the orifice plate, and means for orienting the position of the sleeve with respect to the carrier comprising a protuberance on the sleeve receivable in a groove on the carrier whereby the tapered sleeve will be caused to assume a position when applied to the carrier so that its outer face will be complementary to the tapered seat.

3. A device of the class described comprising a body having an inlet and an outlet connected to each other by a passage through the body, a laterally open tapered seat in the body between the inlet and the outlet, a carrier receivable in the laterally open tapered seat, said carrier being tapered complementary to the taper of the seat and having a passage therethrough adapted to register with the passage in the body when the carrier is seated, O-rings recessed in the faces of the carrier surrounding the passage in the carrier, the passage in the carrier being enlarged adjacent one end thereof, an orifice plate receivable in the enlargement, and a tapered sleeve in the enlargement fitting between the orifice plate and the adjacent side of the tapered seat in the body.

4. A device of the class described comprising a body having an inlet and an outlet connected to each other by a passage through the body, a laterally open tapered seat in the body between the inlet and outlet, a carrier receivable in the laterally open tapered seat, said carrier being tapered complementary to the taper of the seat and having a passage therethrough adapted to register with the passage in the body when the carrier is seated, O-rings recessed in the faces of the carrier surrounding the passage in the carrier, the passage in the carrier being enlarged adjacent one end thereof, an orifice plate receivable in the enlargement, an O-ring recessed in the carrier surrounding the passage therethrough against which the orifice plate seats, and a tapered sleeve in the enlargement fitting between the orifice plate and the adjacent side of the tapered seat in the body.

5. A device of the class described comprising a body having an inlet and an outlet connected to each other by a passage through the body, a laterally open tapered seat in the body between the inlet and outlet, a carrier receivable in the laterally open tapered seat, said carrier being tapered complementary to the taper of the seat and having a passage therethrough adapted to register with the passage in the body when the carrier is seated, O-rings recessed in the faces of the carrier surrounding the passage in the carrier, the passage in the carrier being enlarged adjacent one end thereof, an orifice plate receivable in the enlargement, a tapered sleeve in the enlargement fitting between the orifice plate and the adjacent side of the tapered seat in the body, and interfitting means between the tapered sleeve and the carrier for orienting the position of the tapered sleeve in the enlargement so that its outer face will be caused to assume a position with relation to the carrier complementary to a face of the tapered seat.

References Cited in the file of this patent

UNITED STATES PATENTS

| | | |
|---|---|---|
| 573,323 | Drysdale | Dec. 15, 1896 |
| 1,445,699 | Macey | Feb. 20, 1923 |
| 1,513,031 | Brown | Oct. 28, 1924 |
| 1,569,305 | Robinson | Jan. 12, 1926 |
| 1,609,894 | Trent | Dec. 7, 1926 |
| 1,671,617 | Spitzglass | May 29, 1928 |
| 1,792,950 | Welcome et al. | Feb. 17, 1931 |
| 1,938,458 | McFarlane | Dec. 5, 1933 |
| 1,957,807 | Robinson | May 8, 1934 |
| 1,972,151 | Link | Sept. 4, 1934 |
| 2,014,682 | Greene | Sept. 17, 1935 |
| 2,025,545 | Muff | Dec. 24, 1935 |
| 2,098,747 | Henning | Nov. 9, 1937 |
| 2,309,304 | Creighton | Jan. 26, 1943 |
| 2,339,970 | Young | Jan. 25, 1944 |